3,745,075
HIGHLY PLASTICIZED BINDER FOR
SOLID PROPELLANTS
Adolf H. Muenker, Somerset, Leland K. Beach, Westfield, and Lawrence J. Engel, Dunellen, N.J., assignors to Esso Research and Engineering Company
Filed Sept. 11, 1964, Ser. No. 396,479
Int. Cl. C06d 5/06
U.S. Cl. 149—19     23 Claims

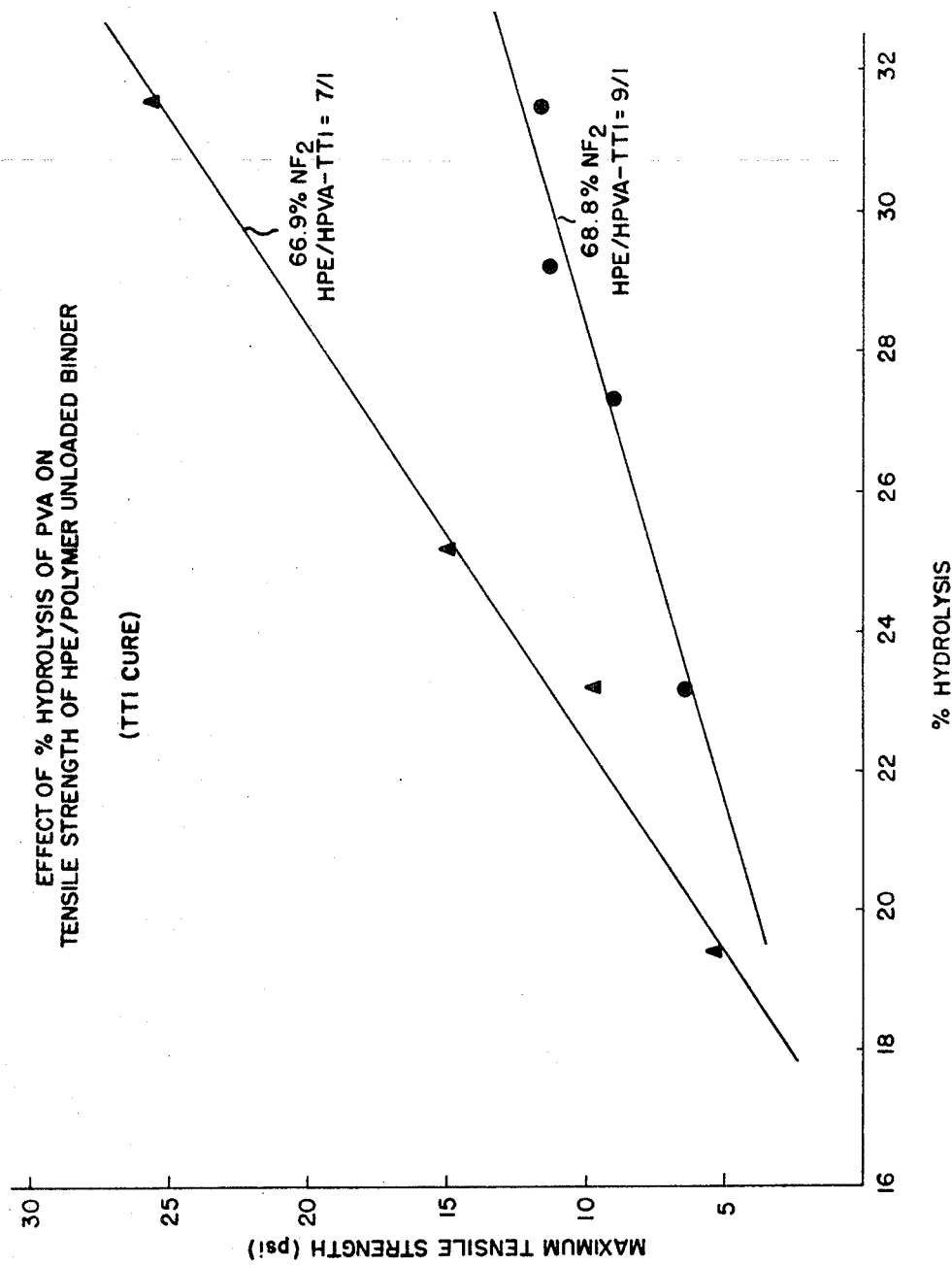
Adolf H. Muenker
Leland K. Beach
Lawrence J. Engel
Inventors
Henry Berk
Patent Attorney United States Patent Office 3,745,075
Patented July 10, 1973

ABSTRACT OF THE DISCLOSURE

A solid rocket propellant containing a highly plasticized polyurethane binder is prepared by dissolving partially hydrolyzed polyvinyl esters in an amino-fluoride, nitro- or nitrato-containing organic liquid oxidizer and reacting this with an isocyanate to form a polyurethane. The propellant contains ammonium perchlorate with a powdered metal fuel.

This invention relates to a binder and the solid rocket propellants based on it, said binder containing a crosslinked polymer of low energy value and holding a relatively large amount of a high-energy liquid organic oxidizer which gives the total plasticized cross-linked polymer, hereafter referred to as a binder, a high impulse value, permits the binder to have adequate physical properties in holding the liquid plasticizer with suitable loading of solid inorganic oxidizers and solid fuel ingredients such as metal powder.

More particularly, this invention discloses the preparation of a highly plasticized binder by dissolving partially hydrolyzed polyvinyl ester such as acetate of desired hydroxyl functionality and molecular weight in an $NF_2$-containing or $NF_2$- and $ONO_2$ or $NF_2$- and $NO_2$-containing organic liquid oxidizer and reacting the partially hydrolyzed polyvinyl ester in the resulting solution mixture with a di- or polyisocyanate crosslinking agent to form a plasticized polyurethane binder that is superior to other known binders in ease of formation and in physical properties with comparable high energy value.

In making the improved highly plasticized binders with partially hydrolyzed polyvinyl ester, certain $NF_2$-containing organic liquids of low volatility, high energy value, solubilizing action on the polymer, and other pertinent properties are employed to obtain the best results. Examples of such $NF_2$-containing organic liquids are hexakis $(NF_2)$dipropyl ether and 1,4-bis-[tris-$(NF_2)$methoxy]-2,3-dinitroxy butane and others of similar characteristics.

A solid propellant may be regarded as being composed of three basic components: binder, oxidizer, and fuel. The binder serves to hold together in a propellant grain oxidizer and fuel particles. For high energy propellants, the energy value of the binder is an important factor.

Some binders have been formed by precuring or using a polymer of little functionality and plasticizing such polymer with a liquid oxidizer, which is absorbed in low proportion and is not kept absorbed in a homogeneous manner.

The binders used in accordance with the present invention are formed by curing a polyfunctional polymer in situ, i.e., in the composite with a large proportion of a liquid plasticizer, solid oxidizer and fuel ingredients, to form a solid rubbery propellant grain. The polyfunctional polymers, such as partially hydrolyzed polyvinyl esters, should contain more than four hydroxyl groups located at random in the polymer chain molecule for crosslinking by an isocyanate crosslinking agent to form a three-dimensional polyurethane of suitable physical properties with ability to hold large amounts of the liquid oxidizer that serves as a curing reaction or crosslinking reaction medium. In the preferred binder preparations the uncured polyfunctional polymers may contain as many as 50 or more OH groups per molecule of the polymer chain, but on the average about 10 to 30 OH groups per molecule in addition to alkylester groups linked to the carbon chain. These polymers, after curing, have their nitrogen constituents only in the urethane linkage, said nitrogen coming from the isocyanate crosslinking agents. It is to be noted that the polymers, before curing or crosslinking, are distinguishable from polymers which contain fewer than four hydroxyl groups and which contain such hydroxyl groups, principally in terminal groups of the polymer chain.

As a general rule the final propellant grain should be a rubbery solid having a tensile strength above 50 p.s.i. and an elongation above 10%, and should show no creep.

A binder must have both acceptable physical properties as well as a high energy content, the latter being in this case a function of the overall $NF_2$ and other energetic oxidizing groups' content of the binder. To impart the highest possible energy level to the binder two approaches are feasible: (1) use of a high $NF_2$-containing polymer or energetic polymer plasticized with a relatively small amount of high $NF_2$-containing or energetic plasticizer; (2) use of a non-$NF_2$ or nonenergetic polymer plasticized with a high proportion of a highly energetic plasticizer.

The second approach, which uses a low energy or non-energetic polymer, requires that the polymer be capable of holding enough liquid energetic plasticizer to give the desired energy level and still retain acceptable physical properties. The liquid oxidizer thus is present in substantially larger weight proportion, e.g., in a ratio from about 5/1 to 15/1 to the cross-linked polymer.

There are a number of advantages in using the second approach over the first, such as eliminating the preparation and handling of a high $NF_2$-content polymer, lowering of the cost, and improving safety aspects leading to the making of the final propellant grain. The present invention discloses the discovery of requisites for making a satisfactory propellant binder with a nonenergetic polymer, more particularly in using a partially hydrolyzed polyvinyl acetate of molecular weight in the range of 500 to 100,000, preferably 2,000 to 20,000, and of composition represented by the recurring units' structures:

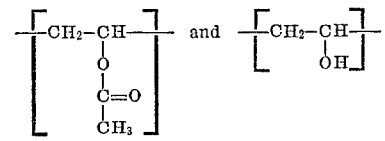

wherein the structural units having the ester or acetate group are in the first bracket and the structural units having the hydroxyl group are in the second bracket are randomly distributed in the polymer chain. The ratio of the numbers of these structural units varies with the mole percent hydrolysis. With the hydrolysis in the range of 15 to 35 mole percent the acetate/hydroxyl group ratio is in the range of from 85/15 to 65/35. In other words, when the hydrolysis is 15 mole percent there are 85 of the acetate units to 15 of the hydroxyl group containing units. For a polymer derived from polyvinyl acetate of 5,000 mole weight, it has been found that preferably the hydrolysis should be in the range of 15 to 35 mole percent when the partially hydrolyzed polyvinyl acetate (herein abbreviated HPVA) is to be dissolved in the preferred high energy liquid plasticizers like hexakis($NF_2$)dipropyl ether (herein abbreviated HPE) which has the compositional formula:

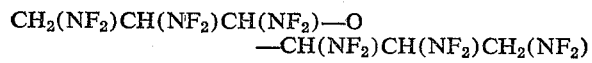

The preparation of the liquid HPE oxidizer, made by the addition reaction of $N_2F_4$ to 1,2-divinyl ethylene oxide, is disclosed in application Ser. No. 246,869, filed by Stogryn et al. on Dec. 17, 1962, now Pat. No. 3,549,707. If the hydrolysis is excessive or the molecular weight too high, the polymer fails to dissolve properly in the liquid plasticizer. It is also important to admix with the solution of the polymer and the liquid plasticizer a suitable crosslinking agent which can be diffused through the solution and react properly with a suitable number of hydroxy groups in the structural units bracketed above to obtain the desired crosslinking. With the HPVA the preferred crosslinking agents are di- or polyisocyanates such as triphenyl methane triisocyanate (abbreviated TTI). A number of other suitable isocyanate crosslinking agents are poly(toluene monoisocyanate), abbreviated PAPI, 1,6-hexamethylene diisocyanate, 2,3 - bis - difluoramino-1,4-butane diisocyanate, and toluene diisocyanate, abbreviated TDI.

For preparing the HPVA polymer by partial hydrolysis, the polyvinyl acetate of suitable molecular weight, e.g., 2,000 to 20,000 preferably, is dissolved in methanol and treated with acid (HCl) or base catalysis at room temperature. The degree of hydroxyl functionality of the polymer can be controlled to any desired level by controlling the extent of hydrolysis: specifically the hydrolysis is terminated by neutralizing the acid medium with gaseous $NH_3$ and precipitating the resulting ammonium salt ($NH_4Cl$ when using HCl catalysis) from a suitable organic solvent in which the polymer is soluble and in which the ammonium salt is insoluble. The precipitation may be carried out in methylene chloride solution. After filtering off the $NH_4Cl$ that precipitated, the solvent is stripped off, preferably under vacuum, and the polymer is dried.

For the purposes of characterization, the partially hydrolyzed polyvinyl acetate, referred to as HPVA, can be considered a copolymer of vinyl acetate and vinyl alcohol although the method of preparation is not via a copolymerization of these monomers.

There are substantial differences in the effects of the crosslinking agents and these differences in turn depend upon the degree of hydrolysis of the PVA and the liquid plasticizer used.

TTI gives considerably higher strength than a diisocyanate such as toluene diisocyanate (TDI) as shown by the following comparison: HPVA of 31.5 mole percent hydrolysis was crosslinked in separate preparations with both TTI and with TDI at a HPE/HPVA weight ratio of 9/1. The following tensile properties were measured after 6 days cure at room temperature.

TABLE I

Effects of crosslinker TTI vs. TDI

| Binder unloaded: | Maximum tensile strength (p.s.i.) |
|---|---|
| HPE/HPVA-TTI | 11.8 |
| HPE/HPVA-TDI | 2.0 |

The effect of percent hydrolysis on maximum tensile strength for a TTI cure at the 9/1 and 7/1 HPE/HPVA-TTI ratio is demonstrated in the attached graph wherein the tensile strength is plotted against percent hydrolysis. The maximum percent hydrolysis of the HPVA which can be used in a particular system is determined by the solubility of the polymer in the liquid plasticizer and by its handling characteristics in a total formulation, which has to take into consideration viscosity and other properties for mixing and casting. The casting into a grain may be carried out in a mold or in the rocket casing used as the mold.

The optimum HPE/HPVA ratio for a given system is a compromise between a low value for adequate strength and a higher value for maximum Isp and processability. This optimum ratio can be adequately evaluated only in a total propellant formulation. Therefore, total formulations were made using commonly employed oxygen-containing oxidizers and fuels such as ammonium perchlorate and aluminum powder and others of these types of solid inorganic oxidizers and fuels. It was found that the HPE/HPVA-TTI binder containing a high proportion of HPE to HPVA such as 9/1, could be satisfactorily loaded with solid oxidizer and solid fuel components to obtain tensile strengths which were unexpectedly high. For instance, a formulation composed of 40% HPE/HPVA-TTI (9/1), 11.2 wt. percent Al powder and 48.8 wt. percent $NH_4ClO_4$ oxidizer cured for 4 days at room temperature had a maximum tensile strength of 102 p.s.i. and an elongation at maximum stress of 35%. This represents an approximate 10-fold increase in tensile strength over that of the binder alone. Because of the high tensile strength at the 9/1 HPE/HPVA-TTI level of the binder, the HPE content of the binder can be further increased. For instance, at an HPE/HPVA-TTI ratio of 12/1, which constitutes a binder of 70.5 wt. percent $NF_2$, the tensile strength of a comparable formulation is 61 p.s.i. with 50% elongation. This is still an acceptable tensile strength for a solid propellant. In addition to the higher $NF_2$ content of the binder, the castability of the propellant mixture is improved. The following data summarize the effect of solid loading on the tensile strength.

TABLE II.—ROOM TEMPERATURE CURE USING TTI CROSSLINKER

Percent hydrolysis of HPVA=29.9%

| Isp (theor.) | Percent binder | HPE/HPVA-TTI | Percent $NF_2$ of binder | Percent solid loading | P.s.i. | Percent elongation |
|---|---|---|---|---|---|---|
| 277 | 100 | 9/1 | 68.7 | 0 | 11.2 | 40 |
| 278 | 40 | 9/1 | 68.7 | ¹60 | 102 | 35 |
| 278 | 40 | 12/1 | 70.5 | ¹60 | 61 | 50 |

¹ 48.8% AP (65µ) and 11.2% Al.

Because of the remarkable physical properties of the above formulation containing 40% binder having 9 parts of liquid plasticizer to one part of the crosslinked polymer, 48.8% $NH_4ClO_4$ and 11.2% Al, this system was given additional propellant evaluation tests. This formulation had a density of 1.87 g./cc. and its impact sensitivity was about 13 kg. cm. In addition to its good physical properties after curing, this formulation was good for easy mixing with a high speed mixer and satisfactory casting at ambient temperatures. An example of the formulation procedure is given as follows:

EXAMPLE 1

A partially hydrolyzed solution of polyvinyl acetate was prepared by polymerizing vinyl acetate (commercial grade) in dried benzene at benzene refluxing temperature with 1,1'-azobisisobutyro nitrile, i.e., (AIBN). The polymerization was carried out under conditions known to give a polyvinyl acetate of a molecular weight of 6,000 to 7,000. Solvent and unreacted monomer were stripped off under vacuum. The polymer product was hydrolyzed by ester exchange with methanol using anhydrous HCl as catalyst. The polymer was dissolved in dry methanol and a solution prepared by passing dry HCl into dry methanol at 0° to 10° C. was added to serve as catalyst. The hydrolysis was terminated by neutralizing the acetate solution with anhydrous NH₃ at the desired hydrolysis point, which is thereby satisfactorily controlled. Following hydrolysis the methanol was stripped off, the polymer redissolved in methylene chloride, and the solution was filtered. After filtering off the ammonium chloride, the methylene chloride solvent was stripped off and the polymer was dried. Under a given set of temperature conditions, including the temperature of hydrolysis, the starting polymer and amount of catalyst, the extent of hydrolysis varies and can be controlled directly by time and catalyst concentration.

A fluid polymer solution can be prepared by mixing the partially hydrolyzed polyvinyl acetate with the $NF_2$-containing liquid plasticizer and letting it stand at room temperature or by heating it moderately, e.g., 50° C., for 4 to 8 hours. Agitation increases the rate of solution. After cooling the solution to 20° C. a mixture of the isocyanate crosslinking agent with the plasticizer is added. Catalysts such as stannous octoate (0.5 wt. percent may be added to speed up the crosslinking reaction. The solid oxygen-oxidizer, e.g., ammonium perchlorate powder, and powdered aluminum fuel are added and the entire formulation is mixed under vacuum for about 30 minutes at 20° C. High shear mixing improves the quality for casting. The formulation is then cast and cured at room temperature. The polymerization occurs readily at 28° C. On casting and curing there is very little shrinking. Burning of the molded grain at the interface with the rocket wall can be controlled by coating the wall with an adhesive, e.g., cellulose acetate, or by compressing the grain as it is being cured. The resulting propellant was found satisfactory in its impact sensitivity and friction sensitivity for safe handling.

Similar satisfactory formulations were made using other common oxidizers such as coated particles of nitronium perchlorate and using other solid powdered fuels such as boron. The formulations with HPVA and a high $NF_2$-containing plasticizer can be well controlled in their physical properties, burning rates and impulse ratings.

Specific impulse can be optimized by adding an $NF_2$-containing polymer such as the liquid, or preferably the solid polymer of trans or cis-1,4-bis-[tris-($NF_2$)methoxy]butene-2-oxide,

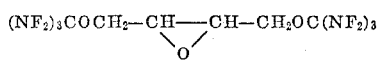

which makes the propellant have Isp values of about 288 and higher. The above polymer does not enter into the crosslinking reaction with the binder and therefore should be considered a solid organic —$NF_2$ oxidizer. In these formulations the liquid $NF_2$-containing plasticizer with the partially hydrolyzed polyvinyl acetate that becomes crosslinked, forms the continuous phase and the $NF_2$-containing solid polymer can be admixed in any desired proportion, e.g., 10 to 50% of the formulation.

The following examples illustrate the addition of solid cis poly(bis-[tris-($NF_2$)methoxy]butene oxide), abbreviated hereafter poly-FABDE, to an HPE/HPVA-TTI binder system:

EXAMPLE 2

One part of HPVA of 24.9 mole percent hydrolysis and a molecular weight of 5,000 to 6,000 is mixed with about 9 parts of HPE at room temperature and allowed to equilibrate overnight. An equivalent amount of TTI (an equivalent amount of TTI refers to the amount of TTI necessary to react all of the hydroxyl groups of the HPVA) is then dissolved in enough HPE and added to the HPE/HPVA solution to bring the final ratio of HPE/HPVA-TTI to 12/1. To this binder are added poly-FABDE, ammonium perchlorate (AP) and boron (B) to give the following propellant composition in weight percent: Theoretical Isp: 288.

| | Percent |
|---|---|
| Binder (HPE/HPVA-TTI=12/1) | 37.5 |
| Solid poly-FABDE | 37.5 |
| AP | 22.5 |
| B | 2.5 |

The total composite was subsequently mixed and cast into a mold. The following physical properties were measured after 4 days cure at room temperature: Tensile strength (p.s.i.), 31; percent elongation, 25.

Higher tensile strengths can be obtained by using HPVA of higher hydrolysis level and/or higher molecular weight. The burning rate of this propellant at 1,000 p.s.i. is 7 inches/second. In view of this high burning rate the above propellant is an excellent candidate for antimissile missiles.

EXAMPLE 3

A similar formulation was prepared using partially hydrolyzed polyvinyl acetate of the same hydrolysis level and molecular weight. Only the relative proportions of binder and poly-FABDE were changed.

| Composition: | Percent |
|---|---|
| Binder (HPE/HPVA-TTI=12/1) | 31.25 |
| Solid poly-FABDE | 43.75 |
| AP | 22.5 |
| B | 2.5 |

Physical properties after 4 days cure at room temperature were: Tensile strength (p.s.i.), 34; percent elongation, 15. Theoretical Isp: 289.

Various other $NF_2$-containing liquid organic oxidizers may be used entirely or partly in place of the hexakis ($NF_2$)-dipropyl ether. Preferably the liquid organic oxidizer, which acts as the solvent and plasticizer of the partially hydrolyzed polyvinyl acetate, should contain a sufficient amount of the $NF_2$ groups and may contain also nitro or nitrate oxidizing groups. The preferred liquid oxidizers contain one $NF_2$ group per carbon atom, as for example in the compounds:

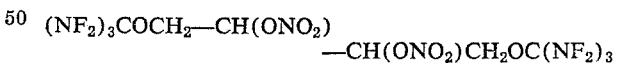

threo, erythro, or mixtures of threo and erythro,

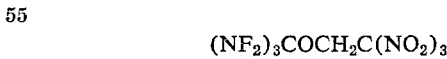

and various others of this type. The liquid organic plasticizer containing the energetic groups preferably should have the suitable qualities of low volatility, low sensitivity and suitable mixing qualities.

Using the liquid plasticizer threo-1,4-bis-[tris-($NF_2$)methoxy]-2,3-dinitroxy butane in place of the HPE plasticizer and in similar ratio to the HPVA and in similar formulations described, the propellant systems obtained give high Isp values from 290 up to about 298. Tensile strengths of 40 to 90 p.s.i. were realized as shown in the following examples:

EXAMPLE 4

One part of HPVA of 24.9 mole percent hydrolysis and a molecular weight of 5,000 to 6,000 is dissolved in 4 parts of threo-1,4-bis-[tris-($NF_2$)methoxy]-2,3-dinitrato butane, abbreviated FABDE-dinitrate, at room temperature overnight. An equivalent amount of TTI is then dissolved in enough FABDE-dinitrate and added to the FABDE-dinitrate/HPVA solution to bring the final ratio of FABDE-dinitrate/HPVA-TTI to 5/1. To this binder, poly-FABDE, ammonium perchlorate (AP) and boron (B) are added to give the following propellant composition:

| | Percent |
|---|---|
| Binder (FABDE-dinitrate/HPVA-TTI=5/1) | 43.2 |
| Solid poly-FABDE | 42.5 |
| AP | 12.7 |
| B | 1.6 |

Theoretical Isp: 288.

The total composite was subsequently mixed and cast into a mold. The following physical properties were measured after 4 days cure at room temperature: Tensile strength (p.s.i.), 91; percent elongation, 25.

EXAMPLE 5

A formulation similar to Example 4 was prepared except that the plasticizer/HPVA-TTI ratio of the binder was 8/1 with the total composition as follows:

| | Percent |
|---|---|
| Binder (FABDE-dinitrate/HPVA-TTI=8/1) | 45.0 |
| Solid poly-FABDE | 42.0 |
| AP | 10.5 |
| B | 2.5 |

Theoretical Isp: 293.5.

After 4 days cure at room temperature the following physicial properties were measured: Tensile strength (p.s.i.), 44; percent elongation, 25.

Mixtures of the liquid and solid isomers of the dinitrate were also employed in formulation studies. All of these formulations gave high burning rates which are useful for antimissile-missile propellants, and antitank missile propellants, burning rates being 6 to 10 in./sec. at 1,000 p.s.i.g. Using as the liquid oxidizer and plasticizer the compound tris($NF_2$)methoxytrinitro ethane having the formula $(NF_2)_3COCH_2C(NO_2)_3$, no additional oxygen source (AP) is required. This liquid organic oxidizer can be used in various ratios to the HPVA to obtain adequate tensile strength and Isp values in the range of 297 to 303, particularly with addition of some amount of energetic polymer such as mentioned.

The use of 2-tris($NF_2$)methoxy-trinitro ethane, abbreviated FATNE, as a high energy plasticizer for the HPVA-TTI polyurethane is illustrated in the following examples:

EXAMPLE 6

One part of HPVA of 24.9 mole percent hydrolysis and a molecular weight of 5,000 to 6,000 is dissolved in 4 parts of tris($NF_2$)methoxy-trinitro ethane (FATNE) at room temperature overnight. An equivalent amount of TTI is then dissolved in enough FATNE and added to the FATNE/HPVA solution to bring the final ratio of FATNE/HPVA-TTI to 5/1. To this binder poly-FABDE and boron are added to give the following propellant composition:

| | Percent |
|---|---|
| Binder (FATNE/HPVA-TTI=5/1) | 79.6 |
| Solid poly-FABDE | 18.2 |
| Boron | 2.2 |

Theoretical Isp: 297.

The total composite was subsequently mixed and cast into a mold. The following physical properties were measured after 4 days cure at room temperature: Tensile strength (p.s.i.), 44; percent elongation, 25.

EXAMPLE 7

A formulation similar to Example 6 was prepared at the same FATNE/HPVA-TTI ratio of the binder except that the amount of poly-FABDE was increased and the percentage of binder decreased. The composition was as follows:

| | Percent |
|---|---|
| Binder (FATNE/HPVA-TTI=5/1) | 61.3 |
| Solid poly-FABDE | 36.2 |
| Boron | 2.5 |

Theoretical Isp: 299.5.

After 4 days cure at room temperature the following physical properties were measured: Tensile strength (p.s.i.), 66; percent elongation, 30.

The partially hydrolyzed polyvinyl acetate has been selected for showing the preferred embodiments on account of the good availability, low cost and good control that this polymer offers. However, similar polymers which can be used in accordance with the principles set forth for making the highly crosslinked polyurethanes in situ include partially hydrolyzed polyvinyl esters such as polyvinyl propionate and polyvinyl butyrate. These polyvinyl esters may be partially hydrolyzed in the similar manner as described with respect to HPVA. Other polymers that have been observed to be similarly useful for preparing the highly plasticized polyurethanes are acrylates, and alkyl acrylate esters which are modified by reaction with a reactant such as glycol, to incorporate into their side chains a number of hydroxy functions, preferably more than 4 OH groups per polymer chain molecule while having the resulting modified polymer contain sufficient hydrogen and carbon constituents to make the modified polymer soluble in the liquid $NF_2$-containing oxidizer which is to serve as the reaction medium and plasticizer. There are still other polymers which may be used such as cellulose esters having a suitable number of hydroxyl functionalities.

In summary, the liquid $NF_2$-plasticizer/HPVA-isocyanate crosslinked binder offers the following advantages over other known binder systems in which the polymer contains $NF_2$ groups:

(1) Better strength at comparable $NF_2$ level.

(2) HPVA is considerably cheaper to prepare; basic polymer with the desired structure is commercially available and a minimum amount of processing is required.

(3) Handling of $NF_2$ material is reduced.

(4) HPVA-based formulations can be cured at room temperature.

(5) The extent of functionality can be readily varied over a wide range to suit specific applications.

(6) Because of the low polymer content of the total propellant formulation (4% in the AP–A1 system) shrinkage is minimal.

In the preferred embodiments of the present invention, which uses the second approach, partially hydrolyzed polyvinyl acetate is crosslinked by reaction of its hydroxyl groups with an organic isocyanate having more than one isocyanate group per molecule to form a polyurethane, and this crosslinking is accomplished by having the partially hydrolyzed polyvinyl acetate homogeneously mixed with and dissolved in a larger weight proportion of a liquid organic compound which contains preferably at least one $NF_2$ group per carbon atom in the compound. The $NF_2$-containing organic compound is preferably a high boiling-point (mainly above 200° C.) liquid which acts as solvent, mixing medium, reaction medium, as the plasticizer, and as the energy source that gives the resulting binder of plasticized crosslinked polyurethane the high $NF_2$ content above 65 wt. percent with the plasticizer being about 80 to 95 wt. percent of this binary mixture and yet forming a rubbery mass of suitable strength.

Among other linear poly(hydroxy-carboxylic ester) polymers to be employed for preparing the polyurethane binder in situ are partially hydrolyzed cellulose acetate and poly(hydroxy-acrylates).

The cellulose acetate is made by acetylation of cellulose with acetic anhydride and acetic acid in the presence of a catalyst or dehydrating agent, e.g., $H_2SO_4$. The cellulose triacetate on partial hydrolysis contains units of triacetate,

[—$C_6H_7O(CH_3COO)_3$—O—]

and units of diacetate with a hydroxyl group,

[—$C_6H_7O(OH)(CH_3COO)_2$—O—]

The poly(hydroxy-acrylates) can be prepared by copolymerizing methyl acrylate or methyl methacrylate with a hydroxy acrylate such as hydroxy ethyl acrylate in proportions to have the linear copolymer contain the desired number of hydroxyl groups per molecule.

The poly(hydroxy-carboxylic esters) described are soluble in the desired proportions of the $NF_2$-containing liquid organic compounds for reaction therein with the polyisocyanates to produce the polyurethanes which have a urethane linkage.

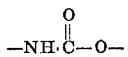

replacing the hydroxyl groups.

In addition to such specifications as specific impulse ($I_{sp}$) and adequate physical properties of a solid propellant formulation, there is a third very important parameter which determines whether a given propellant can be successfully fired in a rocket motor. This parameter is the pressure exponent, $n$. The burning rate of a given propellant is a function of the chamber pressure. Generally, propellants burn faster at the higher pressure. In fact the burning rate of most propellants follows an exponential relationship with pressure of the following type:

$$r = ap^n$$

Where $r$ is the linear burning rate of the propellant in inches/second, $a$ is a constant which depends on the composition of the propellant and the temperature of the propellant, $p$ is the chamber pressure and $n$ is the pressure exponent. To assure controlled burning in a rocket motor the pressure exponent, $n$, should be below 1.0.

Burning rates of propellant compositions using the highly plasticized binder concept have been measured as disclosed herein. The pressure exponents range from 0.79 to about 1.13. In those cases where the pressure exponent was above 1.0 the composition could be effectively changed to reduce the pressure exponent below 1.0 without adversely affecting the $I_{sp}$ and the physical properties of the propellant.

The following examples illustrate the burning rates of propellants using the plasticized HPVA binder disclosed herein.

EXAMPLE 8

Propellants of the following composition were burned at pressures from 100 to 2000 p.s.i.g. and the burning rates determined by known methods:

Composition: Percent
HPVA-TTI ------------------------------- 4
HPE ----------------------------------- 36
AP ------------------------------------ 48
AL ------------------------------------ 12
HPE/HPVA-TTI=9/1.
Isp: 277.

| Pressure, p.s.i.g.: | Burning rate, inches/second |
|---|---|
| 100 | 0.4 |
| 250 | 0.71 |
| 300 | 1.0 |
| 400 | 1.2 |
| 500 | 1.4 |
| 800 | 2.0 |
| 1000 | 2.5 |
| 2000 | 4.3 |

Pressure exponent $n$=0.79.

The addition of poly-FABDE to the HPE/HPVA-TTI binder increases both the burning rate and the pressure exponent. It has been discovered that the pressure exponent can be reduced below 1.0 by controlling the weight ratio of binder to poly-FABDE. This is demonstrated by the following example:

EXAMPLE 9

Propellants of the following three compositions were prepared:

Binder: PHE/HPVA-TTI=12/1

| | Compositions | | |
|---|---|---|---|
| | I | II | III |
| Percent: | | | |
| Binder | 50.0 | 37.5 | 31.25 |
| Poly-FABDE | 25.0 | 37.5 | 43.75 |
| AP | 22.5 | 22.5 | 22.5 |
| B | 2.5 | 2.5 | 2.5 |
| Isp | 288—slightly increasing | | |

These three propellant compositions differ only in the relative proportions of binder and poly-FABDE, the sum of binder and poly-FABDE being 75% by weight.

Burning rates were determined on the above three propellant compositions and the following pressure exponents determined therefrom:

| Composition | Ratio of binder/poly-FABDE | Pressure exponent |
|---|---|---|
| I | 2.0 | 1.13 |
| II | 1.0 | 1.0 |
| III | 0.71 | 0.82 |

From these data it is quite apparent that the pressure exponent of formulations containing the HPE/HPVA-TTI binder and poly-FABDE is governed by the weight ratio of binder to poly-FABDE. What was unexpected is the fact that the higher poly-FABDE level (lower binder/poly-FABDE ratio) gives the lower pressure exponent.

From a viewpoint of pressure exponent it is therefore imperative that the composition be controlled within fairly close limits.

For a propellant containing 25 wt. percent ammonium perchlorate and boron, the binder content (HPE/HPVA-TTI=12/1)

should be below 37.5 wt. percent and poly-FABDE content above 37.5 wt. percent. From a standpoint of processing, additional limits are placed on the weight percentage of the binder. The minimum binder level should not be below 25 wt. percent. This places a maximum of 50 wt. percent on the poly-FABDE level. In summary then the preferred binder level is between 25 wt. percent to 37.5 wt. percent and the corresponding poly-FABDE level between 37.5 wt. percent and 50 wt. percent.

Burning rates were also determined for propellant formulations employing the threo-FABDE-dinitrate/HPVA-TTI binder. The composition of the propellant was as follows:

Percent
Binder (threo - FABDE - dinitrate/HPVA–TTI=
8/1) ------------------------------------ 43.2
Poly-FABDE ------------------------------- 44.3
AP --------------------------------------- 10.0
B ---------------------------------------- 2.5
Isp: 294.3.

Burning rates were as follows:

| Pressure, p.s.i.g.: | Burning rate, inches/second |
|---|---|
| 100 | 1.2 |
| 300 | 2.8 |
| 400 | 3.3 |
| 500 | 3.85 |
| 800 | 6.1 |

From these data the pressure exponent was calculated to be 0.8 which is well within the acceptable limit.

The invention described is claimed as follows:

1. The binder composition for a solid rocket propellant comprising a polyurethane formed by cross-linking the hydroxyl groups of a linear chain polymer having carboxylic ester groups and more than four hydroxyl groups per molecule of the linear chain polymer, the linear chain polymer being soluble in a liquid organic oxidizer that contains at least 3 carbon atoms and at least 3 $NF_2$ groups per molecule and has a boiling point above 200° C., and the polyurethane formed being plasticized by said liquid organic oxidizer.

2. A binder composition as defined in claim 1, wherein the linear chain polymer is selected from the group consisting of partially hydrolyzed polyvinyl esters, acrylate ester polymers having hydroxyl groups attached, and cellulose acetate polymers having hydroxyl groups.

3. The binder for a solid rocket propellant comprising a partially hydrolyzed polyvinyl ester having more than four hydroxyl groups per polymer molecule chain cross-linked by an organic isocyanate having more than one isocyanate group per molecule to form a polyurethane plasticized by a larger weight proportion of a liquid organic compound containing at least 3 carbon atoms and at least 3 $NF_2$ groups per molecule and has a boiling point above 200° C.

4. A binder as defined in claim 3, wherein the polyvinyl ester is 15 to 35 mole percent hydrolyzed and soluble in the liquid organic compound which contains at least one $NF_2$ group per carbon atoms in a molecule.

5. A binder as defined in claim 3, wherein the polyvinyl ester is polyvinyl acetate 15 to 35 mole percent hydrolyzed to form hydroxyl groups crosslinked by the organic isocyanate which contains at least two isocyanate groups per molecule.

6. A binder as defined in claim 3, in which the $NF_2$-containing organic liquid is about 80 to 95 wt. percent of the mixture of the polyurethane with the $NF_2$-containing organic liquid, said mixture being a rubbery mass and having an $NF_2$ content above 65 wt. percent.

7. A binder as defined in claim 3, in which the $NF_2$-containing organic liquid is hexakis($NF_2$)dipropyl ether having the composition:

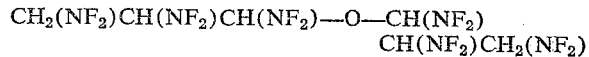

8. A binder as defined in claim 3, in which the $NF_2$-containing organic liquid is threo-1,4-bis-[tris-($NF_2$)methoxy]-2,3-dinitroxy butane.

9. A binder as defined in claim 3, in which the $NF_2$-containing organic liquid is 2-tris($NF_2$)methoxy-1-trinitro ethane.

10. A binder as defined in claim 3, wherein the organic isocyanate is triphenyl methane triisocyanate.

11. A binder as defined in claim 3, in which the $NF_2$-containing polymer of 1,4 - bis - [tris-($NF_2$)methoxy]-butene-2-oxide is present.

12. A binder in a solid rocket propellant containing a powdered metal fuel and solid inorganic oxidizer particles distributed through the binder plasticized by an energetic liquid oxidizer that contains at least 3 carbon atoms and at least 3 $NF_2$ groups per molecule and has a boiling point above 200° C., said binder containing a polyurethane formed by cross-linking linear polymers that contain a multiplicity of carboxylic ester groups and hydroxyl groups, but does not have attached $NF_2$ constituent groups, more than four of the hydroxyl groups per molecule of the linear polymers being converted to urethane linkages and said binder being plasticized by a larger weight proportion of said liquid oxidizer.

13. A binder in a solid rocket propellant containing powdered metal of the group consisting of boron and aluminum as fuel and ammonium perchlorate as oxidizer distributed through the binder plasticized by a liquid oxidizer that contains at least 3 carbon atoms and at least one $NF_2$ group per carbon atoms and has a boiling point above 200° C., said binder containing a polyurethane formed by cross-linking partially hydrolyzed polyvinyl acetate containing more than four hydroxyl groups per molecule with an organic polyisocyanate to convert said hydroxyl groups to urethane linkages, said binder being plasticized by a larger weight proportion of said liquid oxidizer.

14. In a binder as defined in claim 13, said liquid oxidizer being selected from the group consisting of hexakis($NF_2$)dipropyl ether, threo-1,4-bis-[tris-($NF_2$)methoxy]-2,3-dinitroxy butane, and tris($NF_2$)methoxy-trinitro ethane, in a weight proportion of 5 to 15 times that of the polyurethane.

15. In a binder as defined by claim 13, solid cis-poly(bis-[tris-($NF_2$)methoxy]butene oxide).

16. A binder for a high-energy solid propellant capable of containing 55 to 75 wt. percent of powdered metal fuel and ammonium perchlorate admixed with 25 to 45 wt. percent of the binder based on the total propellant, said binder being partially hydrolyzed polyvinyl acetate crosslinked to a polyurethane with triphenyl methane triisocyanate and plasticized by hexakis($NF_2$)dipropyl ether in a proportion of 5 to 15 parts per one part by weight of the polyurethane.

17. The binder of claim 16, in which the 9 parts by weight of the hexakis($NF_2$)dipropyl ether plasticizer is present per one part by weight of the polyurethane in the binder to formulate a propellant having an Isp of 277 when the propellant contains 48 wt. percent ammonium perchlorate and 12 wt. percent aluminum as the powdered metal fuel.

18. A high-energy solid propellant binder suitable for constituting 25 to 50 wt. percent of a total propellant which is 25 to 50 wt. percent solid cis-poly(bis-[tris-($NF_2$)methoxy]butene oxide) and 20 to 25 wt. percent ammonium perchlorate and powdered metal fuel of the group consisting of boron and aluminum, said binder being plasticized polyurethane of partially hydrolyzed polyvinyl acetate crosslinked with triphenyl methane triisocyanate and containing 5 to 15 parts of hexakis($NF_2$) dipropyl ether as the plasticizer per one part by weight of the polyurethane.

19. A binder as defined in claim 18, that gives the propellant a controlled burning rate when said binder is 25 to 37.5 wt. percent and the cis-poly(bis-[tris-($NF_2$)methoxy]butene oxide) is 37.5 to 50 wt. percent of the total propellant.

20. A highly plasticized binder for a solid rocket propellant composite which with the components of ammonium perchlorate and powdered metal of the group consisting of boron and aluminum in a proportion of 20 to 25 wt. percent of the total propellant and with cis-poly (bis-[tris-($NF_2$)methoxy]butene oxide) amounting to 25 to 50 wt. percent of the total propellant composite makes the propellant attain an Isp in the range of 288 to 297, said binder being a polyurethane formed by crosslinking partially hydrolyzed polyvinyl acetate with triphenyl methane triisocyanate plasticized by threo-1,4-bis-[tris-($NF_2$) methoxy]-2,3-dinitroxy butane in a proportion of 5 to 15 parts per one part by weight of said polyurethane.

21. A binder in a solid rocket propellant comprising a polyurethane formed by cross-linking hydroxyl groups of a linear chain polymer having carboxylic ester groups, the linear chain polymer being soluble and dissolved in an energetic liquid organic oxidizer selected from the group consisting of hexakis($NF_2$)dipropyl ether, threo-1,4-bis-[tris-($NF_2$)methoxy]-2,3-dinitroxy butane, and tris($NF_2$)methoxy-trinitro ethane, in a weight proportion of 5 to 15 times that of the polyurethane, the polyurethane formed being plasticized by said liquid organic oxidizer.

22. A binder in a solid rocket propellant containing powdered metal of the group consisting of boron and aluminum as fuel and ammonium perchlorate as an oxidizer distributed through the binder plasticized by a liquid organic oxidizer selected from the group consisting of hexakis($NF_2$)dipropyl ether, threo-1,4-bis-[tris-($NF_2$)methoxy]-2,3-dinitroxy butane, and tris($NF_2$)methoxy-trinitro ethane in a weight proportion of 5 to 15 times that of the polyurethane, said binder containing a polyurethane formed by cross-linking partially hydrolyzed polyvinyl acetate containing more than four hydroxyl groups per molecule with an organic polyisocyanate to convert said hydroxyl groups to urethane linkages, said binder being plasticized by a larger weight proportion of said liquid oxidizer.

23. In the binder defined by claim 22, solid cis-poly(bis-[tris-($NF_2$)methoxy] butene oxide) being admixed therewith.

References Cited

UNITED STATES PATENTS

| 3,103,456 | 9/1963 | Lawton | 149—1 |
| 3,214,465 | 10/1965 | Sausen | 260—543 |

OTHER REFERENCES

Farber: "Astronautics," vol. 5, No. 8, August 1960, pp. 34, 40 (149–19).

BENJAMIN R. PADGETT, Primary Examiner

U.S. Cl. X.R.

149—20, 22, 88, 109